United States Patent
Schäfer et al.

(10) Patent No.: US 7,491,784 B2
(45) Date of Patent: Feb. 17, 2009

(54) METHOD FOR THE PRODUCTION OF ORGANOSILOXANES MODIFIED BY A PHOSPHONIC ACID ESTER

(75) Inventors: Oliver Schäfer, Burghausen (DE); Hans-Joachim Luckas, Munich (DE)

(73) Assignee: Wacker Chemie AG, Munich (DE)

( * ) Notice: Subject to any disclaimer, the term of this patent is extended or adjusted under 35 U.S.C. 154(b) by 342 days.

(21) Appl. No.: 10/595,701

(22) PCT Filed: Oct. 28, 2004

(86) PCT No.: PCT/EP2004/012201

§ 371 (c)(1),
(2), (4) Date: May 5, 2006

(87) PCT Pub. No.: WO2005/047368

PCT Pub. Date: May 26, 2005

(65) Prior Publication Data

US 2007/0167597 A1    Jul. 19, 2007

(30) Foreign Application Priority Data

Nov. 6, 2003   (DE) ................................ 103 51 803

(51) Int. Cl.
*C08G 77/22* (2006.01)
(52) U.S. Cl. .......................................... 528/30; 528/34
(58) Field of Classification Search .................. 528/30, 528/34
See application file for complete search history.

(56) References Cited

U.S. PATENT DOCUMENTS 2,768,193 A    10/1956   Gilbert
2,843,615 A    7/1958    Linville
4,617,344 A  * 10/1986   Tanaka et al. ................ 524/837

OTHER PUBLICATIONS

Gallagher et al., "Synthesis and Characterization of Phosphonate-Containing Polysiloxanes", Journal of Polymer Science, © 2002, vol. 41, pp. 48-59.

* cited by examiner

*Primary Examiner*—Kuo-Liang Peng
(74) *Attorney, Agent, or Firm*—Brooks Kushman P.C.

(57) ABSTRACT

Phosphone ester modified organosilicon compounds are prepared by reacting phosphonic ester-functionalized alkoxysilane with a silanol-functional organosilicon compound. The product is produced in high yield and purity.

15 Claims, No Drawings

METHOD FOR THE PRODUCTION OF ORGANOSILOXANES MODIFIED BY A PHOSPHONIC ACID ESTER

CROSS-REFERENCE TO RELATED APPLICATION

The application is the U.S. national phase of PCT Appln. No. PCT/EP2004/012201 filed Oct. 28, 2004, which claims priority to German application 103 51 803.7 filed Nov. 6, 2003.

BACKGROUND OF THE INVENTION

1. Field of the Invention

The invention relates to a method for the production of phosphonic ester-modified organosilicon compounds by reaction of silanes containing phosphonic ester groups with reactive silicon compounds.

2. Description of the Related Art

Phosphonic ester-modified organosilicon compounds are of great economic interest for a multitude of sectors. For example, they may be used as lubricants of metals and textiles, flame-retardant additives, adhesion promoters, additives for cosmetics or laundry detergents, defoamers, release agents, damping fluids, heat transfer fluids, antistatic agents or for polishes and coatings.

Phosphorus-modified siloxanes are prepared generally by reaction of trialkyl phosphites with chloropropyl-modified siloxanes, as described, for example in Gallagher et al., J. Polym. Sci. Part A, Vol. 41, 48-59 (2003). Unfortunately, long reaction times and high temperatures are needed for this reaction, which leads to rearrangements in the product and thus to yield losses and also to unwanted by-products.

The reaction of trialkyl phosphites with chloromethyl-modified siloxanes as described in U.S. Pat. No. 2,768,193 or by Gallagher et al. proceeds significantly more quickly but has the disadvantage that the siloxanes thus produced are difficult to purify by distillation on account of their high boiling point. In addition, however, the progress of this reaction is slow, since the concentration of the reactive groups is greatly reduced by dilution with unreactive dimethylsiloxy units, resulting in reaction times in the region of several hours.

SUMMARY OF THE INVENTION

An object of the invention, then, was to provide a method for the production of phosphonic ester-modified organosiloxanes that makes it possible, starting from commercially available chemicals, to produce phosphonic ester-modified organosiloxanes extremely simply, with short reaction times, and in high yields. These and other objects are attained by reaction of an alkoxysilane phosphonic ester with a silanol-functional organosilicon compound.

DETAILED DESCRIPTION OF THE PREFERRED EMBODIMENTS

The invention provides a method for the production of phosphonic ester-modified organosiloxanes of the general formula

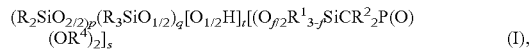  (I), in which
R is a hydrogen atom or a monovalent, optionally —CN—, —NCO—, $NR^5{}_2$—, —COOH—, —COOR$^5$—, -halogen-, -acryloyl-, -epoxy-, —SH—, —OH— or —CONR$^5{}_2$-substituted Si—C-bonded $C_1$-$C_{20}$ hydrocarbon radical or $C_1$-$C_{15}$ hydrocarbonoxy radical in which one or more nonadjacent methylene units in each case may be replaced by groups —O—, —CO—, —COO—, —OCO— or —OCOO—, —S— or —NR$^5$— and in which one or more nonadjacent methine units may be replaced by groups —N=, —N=N— or —P=, $R^1$ is a hydrogen atom or a monovalent, optionally —CN—, —NCO—, —COOH—, —COOR$^5$—, -halogen-, -acryloyl-, —SH—, —OH— or —CONR$^5{}_2$— substituted Si—C-bonded $C_1$-$C_{20}$ hydrocarbon radical or $C_1$-$C_{15}$ hydrocarbonoxy radical in which one or more nonadjacent methylene units in each case may be replaced by groups —O—, —CO—, —COO—, —OCO—, or —OCOO—, —S—, or —NR$^5$— and in which one or more nonadjacent methine units may be replaced by groups —N=, —N= or —P=, $R^2$ is hydrogen or an optionally —CN— or halogen-substituted $C_1$-$C_{20}$ hydrocarbon radical, $R_4$ is hydrogen or an optionally —CN— or halogen-substituted $C_1$-$C_{20}$ hydrocarbon radical or substituted or unsubstituted polyalkylene oxides having 1 to 4000 carbon atoms, $R^5$ is hydrogen or an optionally —CN— or halogen-substituted substituted $C_1$-$C_{10}$ hydrocarbon radical, p is 0 or an integer of from 1 to 100 000,
q is 0 or an integer of from 1 to 100 000,
f is the number 1 or 2 or 3,
s is an integer which is at least 1 and
t is 0 or an integer which is at least 1,
p+q being an integer which is at least 1, characterized in that at least one silane of the formula $$[(R^3O)_fR^1{}_{3-f}SiCR^2{}_2P(O)(OR^4)_2] \quad [III]$$

is reacted with at least one silicon compound of the general formula

  [IV]

where
$R^3$ is hydrogen or an optionally —CN— or halogen-atom-substituted $C_1$-$C_{20}$ hydrocarbon radical, and
m is an integer 1 or 2,
R, $R^1$, $R^2$, $R^4$, p, q, f and s have the above definitions.

The phosphonic ester-modified organosiloxanes of the general formula (I) have a phosphonic ester function which is attached via a C atom through a Si—C—P bond to a silicon atom of the organosilicon compound.

The radicals R may be alike or different, substituted or unsubstituted, aliphatically saturated or unsaturated, aromatic, cyclic, straight-chain or branched. R preferably has 1 to 12 carbon atoms, in particular 1 to 6 carbon atoms, and is preferably unsubstituted. More preferably, R is a straight chain or branched $C_1$-$C_6$ alkyl radical, the methyl, ethyl, phenyl, vinyl and trifluoropropyl radicals being particularly preferred.

Preferably, R is a straight chain or branched $C_1$-$C_6$ alkyl radical, the methyl, ethyl, phenyl, vinyl and trifluoropropyl radical being particularly preferred.

The radicals $R^1$ may be alike or different, substituted or unsubstituted, aliphatically saturated or unsaturated, aromatic, cyclic, straight-chain or branched. $R^1$ is preferably a $C_1$-$C_{10}$ alkyl radical or phenyl radical, especially a branched or unbranched $C_1$-$C_3$ alkyl radical, which may also be substituted. With particular preference, $R^1$ is a methyl radical or ethyl radical.

The radicals $R^2$ may, independently of one another, likewise be substituted or unsubstituted, aliphatically saturated or unsaturated, aromatic, cyclic, straight-chain or branched. $R^2$ is preferably a $C_1$-$C_3$ alkyl radical or hydrogen atom. With particular preference, $R^2$ is hydrogen atom.

The radicals $R^3$ may, independently of one another, likewise be substituted or unsubstituted, aliphatically saturated or unsaturated, aromatic, cyclic, straight-chain or branched. $R^3$ is preferably a $C_1$-$C_5$ alkyl radical or hydrogen atom, especially $C_1$-$C_3$ alkyl radical or hydrogen atom. With particular preference, $R^3$ is a methyl or ethyl radical.

The radicals $R^4$, may independently of one another, likewise be substituted or unsubstituted, aliphatically saturated or unsaturated, aromatic, cyclic, straight-chain or branched. $R^4$ is preferably a $C_1$-$C_{12}$ alkyl or aryl radical. With particular preference, $R^4$ is a methyl, ethyl, butyl, phenyl or cyclohexyl radical. $R^4$ may, if desired, also contain heteroatoms such as an oxygen atom or nitrogen atom or other functional group.

The radicals $R^5$ are preferably a hydrogen atom or an unsubstituted or substituted $C_1$-$C_{10}$ alkyl radical.

Preferably p is an integer from 3 to 1000, in particular from 5 to 500.

Preferably m is 1 or 2, especially 2.

Preferably q is 0 or 2.

Preferably s is an integer from 1 to 50, in particular from 2 to 10.

Preferably t is 0, 1, 2 or 3, in particular 0, 1 or 2.

Preferably the sum p+q is an integer which is at least 2, in particular at least 3.

Examples of the silanes of the formula (III) that are used in accordance with the invention are $H_3COSi(CH_3)_2CH_2PO(OC_2H_5)_2$, $(H_3CO)_2Si(CH_3)CH_2PO(OC_2H_5)_2$, $(H_3CO)_3SiCH_2PO(OC_2H_5)_2$, $(H_5C_2O)Si(CH_3)_2CH_2PO(OC_2H_5)_2$, $(H_5C_2O)_2Si(CH_3)CH_2PO(OC_2H_5)_2$, $(H_5C_2O)_3SiCH_2PO(OC_2H_5)_2$, $H_3COSi(CH_3)_2CH_2PO(OCH_3)_2$, $(H_3CO)_2Si(CH_3)CH_2PO(OCH_3)_2$, $(H_3CO)_3SiCH_2PO(OCH_3)_2$, $(H_5C_2O)Si(CH_3)_2CH_2PO(OCH_3)_2$, $(H_5C_2O)_2Si(CH_3)CH_2PO (OCH_3)_2$ and $(H_5C_2O)_3SiCH_2PO(OCH_3)_2$.

Preferably the silanes of the formula (III) that are used in accordance with the invention are $H_3COSi(CH_3)_2CH_2PO(OC_2H_5)_2$, $(H_3CO)_2Si(CH_3)CH_2PO(OC_2H_5)_2$, $(H_3CO)_3SiCH_2PO(OC_2H_5)_2$, $(H_5C_2O)Si(CH_3)_2CH_2PO(OC_2H_5)_2$, $(H_5C_2O)_2Si(CH_3)CH_2PO(OC_2H_5)_2$, $(H_5C_2O)_3SiCH_2PO(OC_2H_5)_2$, with $H_3COSi(CH_3)_2CH_2PO(OC_2H_5)_2$, $(H_3CO)_2Si(CH_3)CH_2PO(OC_2H_5)_2$, $(H_5C_2O)Si(CH_3)_2CH_2PO(OC_2H_5)_2$, and $(H_5C_2O)_2Si(CH_3)CH_2PO(OC_2H_5)_2$ being particularly preferred.

The silanes of the formula (III) that are used in accordance with the invention are commercially customary products and/or can be prepared by methods which are known in silicon chemistry. For instance, the alkoxysilanes of the general formula (III) that are used can be prepared simply and in high yields by reaction of the corresponding chloroalkyl(alkoxy) silanes with trialkyl phosphites, as is described for example in U.S. Pat. No. 2,7681,93.

Examples of the silicon compounds of the formula (IV) that are used in accordance with the invention are $[(H_3C)_2SiO_{2/2}]_{15}[O_{1/2}H]_2$, $[(H_3C)_2SiO_{2/2}]_{30}[O_{1/2}H]_2$, $[(H_3C)_2SiO_{2/2}]_{55}[O_{1/2}H]_2$, $[(H_3C)_2SiO_{2/2}]_{150}[O_{1/2}H]_2$, $[(H_3C)_3SiO_{1/2}][(H_3C)_2SiO_{2/2}]_{20}[O_{1/2}H]$, $[(H_3C)_3SiO_{1/2}][(H_3C)_2SiO_{2/2}]_{50}[O_{1/2}H]$, $[(H_3C)(H_5C_6)SiO_{2/2}]_{15}[O_{1/2}H]_2$, $[(H_3C)(H_5C_6)SiO_{2/2}]_{35}[O_{1/2}H]_2$, $[(H_5C_6)_2SiO_{2/2}]_{25}[O_{1/2}H]_2$, $[(H_3C)(F_3H_4C_3)SiO_{2/2}]_{20}[O_{1/2}H]_2$, $[(H_3C)(H_3C_2)SiO_{2/2}]_{20}[O_{1/2}H]_2$ and $[(H_3C)(H)SiO_{2/2}]_{30}[O_{1/2}H]_2$.

Preferably the silicon compounds of the formula (IV) that are used in accordance with the invention are $[(H_3C)_2SiO_{2/2}]_{15}[O_{1/2}H]_2$, $[(H_3C)_2SiO_{2/2}]_{30}[O_{1/2}H]_2$, $[(H_3C)_2SiO_{2/2}]_{55}[O_{1/2}H]_2$, $[(H_3C)_2SiO_{2/2}]_{150}[O_{1/2}H]_2$, $[(H_3C)_3SiO_{1/2}][(H_3C)_2SiO_{2/2}]_{20}[O_{1/2}H]$ and $[(H_3C)_3SiO_{1/2}][(H_3C)_2SiO_{2/2}]_{50}[O_{1/2}H]$, with $[(H_3C)_2SiO_{2/2}]_{15}[O_{1/2}H]_2$, $[(H_3C)_2SiO_{2/2}]_{30}[O_{1/2}H]_2$, and $[(H_3C)_2SiO_{2/2}]_{55}[O_{1/2}H]_2$, being particularly preferred.

The silicon compounds of the formula (IV) that are used in accordance with the invention are commercially customary products and/or can be prepared by methods that are known in silicon chemistry.

In the method of the invention silicon compound of the formula (III) is used in amounts of preferably 0.5 to 80 parts by weight, with particular preference of 2 to 50 parts by weight, based in each case on 100 parts by weight of the compound of the general formula (IV).

In the process of the invention silanes of the general formula (III) are reacted with silicon compounds of the general formula (IV). This reaction may take place under mild conditions, which allows reaction of an Si—OH group on the siloxane of the general formula (IV) with the silane of the general formula (III) without Si—O—Si bonds of the siloxanes of the formula (IV) being broken and possibly re-established. In this case it is advantageously possible to do without the use of special catalysts in some cases. However, the reaction according to the invention progresses with the use of catalysts, particularly those which are used in accordance with the prior art for preparing alkoxy-terminated siloxanes or for accelerating the reaction of alkoxysilanes, in RTV-1 compositions, for example, more rapidly and more completely. It is, however, also possible to use other catalysts, such as phosphoric acids or partial phosphoric esters, such as isopropyl phosphate, for example.

If catalyst is used in the method of the invention, the amounts involved are preferably 0.0005 to 10 parts by weight, with particular preference for 0.005 to 2 parts by weight, based in each case on 100 parts by weight of the compound of the general formula (IV).

Preferably the method of the invention is carried out at temperatures of 0 to 200° C., with particular preference of 30 to 100° C.

Preferably the method of the invention is carried out under a pressure of 0.01 to 2000 hPa, with particular preference under the pressure of the surrounding atmosphere, i.e., about 900 to 1100 hPa. If desired, it is possible to use inert gases such as nitrogen, noble gases or carbon dioxide, for example. The oxygen content of the surrounding atmosphere ought advantageously to be maintained within limits of 0 to 30% by volume. The generation of explosive mixtures ought to be avoided on safety grounds.

Elimination products formed in the course of the reaction according to the invention, such as alcohol, can be removed, during or after the reaction of the reaction mixture, in a known way, such as, for example, by distillation under reduced pressure at room temperature or at elevated temperature.

The method of the invention can be carried out both with incorporation of solvents or alternatively without the use of solvents, the reaction without addition of solvents being preferred.

If solvents are used in the method of the invention, those involved are preferably inert, in particular aprotic solvents, such as aliphatic hydrocarbons, such as heptane or decane, for example, and aromatic hydrocarbons, such as toluene or xylene, for example. Likewise, it is possible to use ethers, such as tetrahydrofuran (THF), diethyl ether, tert-butyl methyl ether (MTBE) or ketones such as acetone or 2-butanone (MEK). If solvents are used in the method of the invention, those involved are, with particular preference, organic solvents or solvent mixtures having a boiling point or boiling range of up to 150° C. at 1000 hPa.

The quantity and identity of the solvent is preferably chosen such as to ensure sufficient homogenization with the reaction mixture.

The method of the invention is carried out preferably in an inert gas atmosphere, such as under nitrogen.

The components used in the method of the invention may in each case be one kind of such a component or else a mixture of at least two kinds of a respective component.

The method of the invention can be carried out batchwise or continuously in reactors suitable for such methods in each case.

Depending on conditions, the method of the invention produces cyclic, linear or branched products which depending on their phosphonic ester group content exhibit solubilities in different solvents. In this context, as the amount of the phosphonic ester groups in the siloxanes goes up, there is an increase in the solubility in polar solvents. Emulsifiability in water is significantly enhanced. When preparing emulsions it is possible if desired to use additional, prior-art emulsifiers, which may be either ionic or nonionic emulsifiers. The compounds of the general formula (I) produced by the method of the invention form stable emulsions in water even without the use of additional emulsifiers, however. This is of advantage especially in the textiles and cosmetics sectors.

The products produced in accordance with the invention are obtained in high yields, of preferably more than 90%.

The products produced in accordance with the invention can be used for all purposes for which phosphonic ester-modified siloxanes have also been employed to date, such as coatings on textiles or plastics, for example, or as additives in the plastics or cosmetics sector.

The method of the invention has the advantage that it is easy to implement and the reaction product is no longer required to go through any further, costly and inconvenient purifying operations.

The method of the invention has the advantage that no further low molecular mass cyclic siloxane compounds are formed, such compounds having to be removed by costly and inconvenient distillation.

The method of the invention has the advantage, furthermore, that short reaction times are achievable and that the reactants used are available in sufficient purity and the reaction to the end product takes place in yields of, with particular preference, >95%, meaning that no further impurities need be removed.

In the examples below, all reported parts and percentages are by weight unless indicated otherwise. Unless indicated otherwise the examples which follow are carried out under the pressure of the surrounding atmosphere, i.e., at approximately 1000 hPa, and at room temperature, i.e., at about 20° C., or at a temperature which comes about when the reactants are combined at room temperature without additional heating or cooling.

Preparation of
diethoxyphosphitomethyldimethoxymethylsilane
(Silane A)

A 250 ml three-necked flask with dropping funnel and reflux condenser was charged under nitrogen atmosphere with 99.7 g (0.6 mol) of triethyl phosphite (P(OEt)$_3$), Aldrich, GC 98%). After this initial charge had been heated to 140° C., 46.4 g of chloromethyldimethoxymethylsilane (0.3 mol) (commercially available from Wacker-Chemie GmbH, Munich) were slowly added dropwise over the course of 3 hours with vigorous stirring. Subsequently the reaction mixture was heated at 170° C. for 30 minutes. After the excess triethyl phosphite had been stripped off under reduced pressure 58.6 g of diethoxyphosphitomethyldimethoxymethylsilane (0.23 mol, GC 98%, yield: 76% of theory) were distilled off at a temperature of 133° C. and a reduced pressure of 12 mBar.

Preparation of
diethoxyphosphitomethyldimethylmethoxysilane
(Silane B)

A 250 ml three-necked flask with dropping funnel and reflux condenser was charged under nitrogen atmosphere with 124.5 g (0.75 mol) of triethyl phosphite (P(OEt)$_3$), Aldrich, GC 98%). After this initial charge had been heated to 140° C., 69.3 g of chloromethyldimethylmethoxysilane (0.5 mol) (commercially available from Wacker-Chemie GmbH, Munich) were slowly added dropwise over the course of 2.5 hours with vigorous stirring. Subsequently the reaction mixture was heated at 170° C. for 30 minutes. After the excess triethyl phosphite had been stripped off under reduced pressure 100.4 g of diethoxyphosphitomethyldimethylmethoxysilane (0.42 mol, GC 98.2%, yield: 83.6% of theory) were distilled off at a temperature of 118-122° C. and a reduced pressure of 11 mbar.

Preparation of
diethoxyphosphitomethyltrimethoxysilane (Silane C)

A 250 ml three-necked flask with dropping funnel and reflux condenser was charged under nitrogen atmosphere with 112.2 g (0.675 mol) of triethyl phosphite (P(OEt)$_3$), Aldrich, GC 98%). After this initial charge had been heated to 140° C., 76.8 g of chloromethyltrimethoxysilane (0.45 mol) (commercially available from Wacker-Chemie GmbH, Munich) were slowly added dropwise over the course of 2.5 hours with vigorous stirring. Subsequently the reaction mixture was heated at 170° C. for 30 minutes. After the excess triethyl phosphite had been stripped off under reduced pressure 105.6 g of diethoxyphosphitomethyltrimethoxysilane (0.39 mol, GC 97.4%, yield: 86.2% of theory) were distilled off at a temperature of 135-138° C. and a reduced pressure of 12 mBar.

EXAMPLE 1

A 500 ml three-necked flask with dropping funnel and reflux condenser was charged under nitrogen atmosphere with 26.1 g of diethoxyphosphitomethyldimethoxymethylsilane (0.10 mol, GC 98%), whose preparation is described above under "Silane A". Following the addition of 0.5% by weight of isopropyl phosphate catalyst and heating to 60° C., 220 g of a doubly OH-terminated polydimethylsiloxane (M=1100 g/mol; 0.2 mol) were slowly added dropwise over the course of 10 minutes with vigorous stirring. Subsequently the reaction mixture was heated at 80° C. for 120 minutes. After the alcohol formed has been stripped off under reduced pressure, 239 g of poly((diethoxyphosphitomethyl)methylsiloxane-co-dimethylsiloxane) were obtained with an average molecular weight (number average) of 2500 g/mol. This is a linear block copolymer in which two polydimethylsiloxane chains are joined via a diethoxyphosphitomethylmethylsiloxane unit.

EXAMPLE 2

A 250 ml three-necked flask with dropping funnel and reflux condenser was charged under nitrogen atmosphere with 48.9 g of diethoxyphosphitomethyldimethylmethoxysilane (0.20 mol, GC 98%), whose preparation is described above under "Silane B". Following the addition of 0.5% by weight of isopropyl phosphate catalyst and heating to 60° C., 110 g of a doubly OH-terminated polydimethylsiloxane (M=1100 g/mol; 0.1 mol) were slowly added dropwise over the course of 10 minutes with vigorous stirring. Subsequently the reaction mixture was heated at 80° C. for 120 minutes. After the alcohol formed has been stripped off under reduced pressure, 153 g of a polydimethylsiloxane containing diethoxyphosphitomethyl end groups were obtained with an average molecular weight (number average) of 1500 g/mol. This is a linear block copolymer in which a diethoxyphosphitomethylmethylsiloxane unit is joined to each of the two ends of a polydimethylsiloxane chain.

EXAMPLE 3

A 500 ml three-necked flask with dropping funnel and reflux condenser was charged under nitrogen atmosphere with 48.9 g of diethoxyphosphitomethyldimethylmethoxysilane (0.20 mol, GC 98%), whose preparation is described above under "Silane B". Following the addition of 0.5% by weight of isopropyl phosphate catalyst and heating to 60° C., 300 g of a doubly OH-terminated polydimethylsiloxane (M=3000 g/mol; 0.1 mol) were slowly added dropwise over the course of 10 minutes with vigorous stirring. Subsequently the reaction mixture was heated at 80° C. for 240 minutes. After the alcohol formed has been stripped off under reduced pressure, 343 g of a polydimethylsiloxane containing diethoxyphosphitomethyl end groups were obtained with an average molecular weight (GPC, number average) of 3600 g/mol. This is a linear block copolymer in which a diethoxyphosphitomethylmethylsiloxane unit is joined to each of the two ends of a polydimethylsiloxane chain.

EXAMPLE 4

A 250 ml three-necked flask with dropping funnel and reflux condenser was charged under nitrogen atmosphere with 4.9 g of diethoxyphosphitomethyldimethylmethoxysilane (0.02 mol, GC 98%), whose preparation is described above under "Silane B". Following the addition of 0.5% by weight of isopropyl phosphate catalyst and heating to 60° C., 108 g of a doubly OH-terminated polydimethylsiloxane (M=10 800 g/mol; 0.01 mol) were slowly added dropwise over the course of 10 minutes with vigorous stirring. Subsequently the reaction mixture was heated at 80° C. for 300 minutes. After the alcohol formed has been stripped off under reduced pressure, 110 g of a polydimethylsiloxane containing diethoxyphosphitomethyl end groups were obtained with an average molecular weight (GPC, number average) of 12 300 g/mol. This is a linear block copolymer in which a diethoxyphosphitomethylmethylsiloxane unit is joined to each of the two ends of a polydimethylsiloxane chain.

EXAMPLE 5

A 250 ml three-necked flask with dropping funnel and reflux condenser was charged under nitrogen atmosphere with 26.1 g of diethoxyphosphitomethyldimethoxymethylsilane (0.10 mol, GC 98%), whose preparation is described above under "Silane B". Following the addition of 0.5% by weight of isopropyl phosphate catalyst and heating to 60° C., 110 g of a doubly OH-terminated polydimethylsiloxane (M=1100 g/mol; 0.1 mol) were slowly added dropwise over the course of 10 minutes with vigorous stirring. Subsequently the reaction mixture was heated at 80° C. for 120 minutes. After the alcohol formed has been stripped off under reduced pressure, 121 g of a polydimethylsiloxane containing diethoxyphosphitomethyl end groups and were obtained with an average molecular weight (number average) of 10 060 g/mol. This is a linear block copolymer in which a diethoxyphosphitomethylmethylsiloxane unit is incorporated periodically in a long polydimethylsiloxane chain.

EXAMPLE 6

A 250 ml three-necked flask with dropping funnel and reflux condenser was charged under nitrogen atmosphere with 4.9 g of diethoxyphosphitomethyldimethylmethoxysilane (0.02 mol, GC 98%), whose preparation is described above under "Silane B". Following the addition of 0.5% by weight of a part-esterified phosphoric ester catalyst containing polyalkylene oxide units (commercially available under the brand name ARLYPON® from Cognis) and heating to 60° C., 108 g of a doubly OH-terminated polydimethylsiloxane (M=10 800 g/mol; 0.01 mol) were slowly added dropwise over the course of 10 minutes with vigorous stirring. Subsequently the reaction mixture was heated at 80° C. for 300 minutes. After the alcohol formed has been stripped off under reduced pressure, 110 g of a polydimethylsiloxane containing diethoxyphosphitomethyl end groups were obtained with an average molecular weight (GPC, number average) of 10 900 g/mol. This is a linear block copolymer in which a diethoxyphosphitomethylmethylsiloxane unit is joined to each of the two ends of a polydimethylsiloxane chain.

EXAMPLE 7

A 500 ml three-necked flask with dropping funnel and reflux condenser was charged under nitrogen atmosphere with 27.6 g of diethoxyphosphitomethyltrimethoxysilane (0.1 mol, GC 98%), whose preparation is described above under "Silane C". Following the addition of 0.5% by weight of isopropyl phosphate catalyst and heating to 60° C., 390 g of a singly OH-terminated polydimethylsiloxane (prepared by anionic addition polymerization of D3 rings, M=1300 g/mol; 0.3 mol) were slowly added dropwise over the course of 10 minutes with vigorous stirring. Subsequently the reaction mixture was heated at 80° C. for 280 minutes. After the alcohol formed has been stripped off under reduced pressure, 308 g of a polydimethylsiloxane containing a diethoxyphosphitomethyl group were obtained with an average molecular weight (GPC, number average) of 4200 g/mol. This is a star-shaped block copolymer in which three polydimethylsiloxane chains are attached in the middle to a diethoxyphosphitomethylsiloxane unit.

EXAMPLE 8

Siloxane/water emulsions were produced by adding 70 ml water to 30 g in each case of an inventively functionalized or non-functionalized siloxane and homogenizing or emulsifying the mixture using a high-speed stirrer, known as an Ultra-Turrax, for 30 seconds. The resulting compositions were in each case milky systems, in which a measurement was made of the time which elapsed before separation. The results are found in Table 1:

TABLE 1

| Silicone oil | Appearance | Phase separation after |
|---|---|---|
| Example 2 | milky | >20 days |
| bis-OH-terminated (M = 1100 g/mol) | milky | 3 days |
| Example 3 | milky | 5 days |
| bis-OH-terminated (M = 3000 g/mol) | milky | 1 day |
| Example 4 | milky | 3 days |
| bis-OH-terminated (M = 10800 g/mol) | milky | 1 day |

It was apparent that the compounds produced by the method of the invention have significantly higher stability as emulsions in water than the corresponding non-functional silicone oils of equal molecular weight.

The invention claimed is:

1. A process for the preparation of phosphonic ester-modified organosiloxanes of the formula

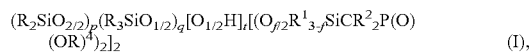
(I), in which
R is a hydrogen atom or a monovalent, optionally —CN—, —NCO—, $NR^5_2$—, —COOH—, —COOR$^5$—, -halogen-, -acryloyl-, -epoxy-, —SH—, —OH— or —CONR$^5_2$— substituted Si—C-bonded $C_1$-$C_{20}$ hydrocarbon radical or $C_1$-$C_{15}$ hydrocarbonoxy radical in which one or more nonadjacent methylene units may be replaced by groups —O—, —CO—, —COO—, —OCO—, —OCOO—, —S—, or —NR$^5$— and in which one or more nonadjacent methine units may be replaced by groups —N=, —N= or —P=, $R^1$ is a hydrogen atom or a monovalent, optionally —CN—, —NCO—, —COOH—, —COOR$^5$—, -halogen-, -acryloyl-, —SH—, —OH— or —CONR$^5_2$— substituted Si—C-bonded $C_1$-$C_{20}$ hydrocarbon radical or $C_1$-$C_{15}$ hydrocarbonoxy radical in which one or more nonadjacent methylene units may be replaced by groups —O—, —CO—, —COO—, —OCO—, —OCOO—, —S—, or —NR$^5$— and in which one or more nonadjacent methine units may be replaced by group, —N=, —N= or —P=, $R^2$ is hydrogen or an optionally —CN— or halogen-substituted $C_1$-$C_{20}$ hydrocarbon radical, $R^4$ is hydrogen or an optionally —CN— or halogen-substituted $C_1$-$C_{20}$ hydrocarbon radical or a substituted or unsubstituted polyalkylene oxide having 1 to 4000 carbon atoms, $R^5$ is hydrogen or an optionally —CN— or halogen-substituted $C_1$-$C_{10}$ hydrocarbon radical, p is 0 or an integer from 1 to 100,000, q is 0 or an integer from 1 to 100,000, f is 1, 2 or 3, s is an integer which is at least 1 and t is 0 or an integer which is at least 1, p+q is an integer which is at least 1, comprising reacting:

at least one silane of the formula

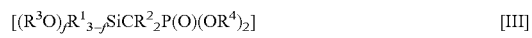 [III]

with at least one silicon compound of the general formula

 [IV]

where
$R^3$ is hydrogen or an optionally —CN— or halogen-atom-substituted $C_1$-$C_{20}$ hydrocarbon radical, and
m is an integer 1 or 2, the reaction taking place neat or in organic solvent.

2. The process of claim 1, wherein the sum p+q is an integer which is at least 2.

3. The process of claim 2, carried out in the presence of catalyst.

4. The process of claim 2, carried out at temperature(s) of 0 to 200° C.

5. The process of claim 2, carried out in an inert gas atmosphere.

6. The process of claim 1, carried out in the presence of catalyst.

7. The process of claim 6, carried out at temperature(s) of 0 to 200° C.

8. The process of claim 6, carried out in an inert gas atmosphere.

9. The process of claim 1, carried out at temperature(s) of 0 to 200° C.

10. The process of claim 9, carried out in an inert gas atmosphere.

11. The process of claim 1, carried out in an inert gas atmosphere.

12. The process of claim 1, wherein the reaction takes place in an aprotic organic solvent.

13. The process of claim 1, wherein the reaction takes place in the absence of a catalyst.

14. The process of claim 1, wherein the reaction takes place neat.

15. The process of claim 1, wherein the reaction mixture is homogenous.

* * * * *

UNITED STATES PATENT AND TRADEMARK OFFICE
CERTIFICATE OF CORRECTION

PATENT NO. : 7,491,784 B2  Page 1 of 1
APPLICATION NO. : 10/595701
DATED : February 17, 2009
INVENTOR(S) : Oliver Schaefer et al.

It is certified that error appears in the above-identified patent and that said Letters Patent is hereby corrected as shown below:

Column 9, Line 25, Claim 1:

Delete:

"$(R_2SiO_{2/2})_p(R_3SiO_{1/2})_q[O_{1/2}H]_t[(O_{f/2}R^1{}_{3-f}SiCR^2{}_2P(O)(OR^4)_2]_2$"

And insert:

--$(R_2SiO_{2/2})_p(R_3SiO_{1/2})_q[O_{1/2}H]_t[(O_{f/2}R^1{}_{3-f}SiCR^2{}_2P(O)(OR^4)_2]_s$--

Signed and Sealed this

Twenty-first Day of April, 2009

JOHN DOLL
*Acting Director of the United States Patent and Trademark Office*